United States Patent Office 3,575,990
Patented Apr. 20, 1971

3,575,990
4-AR₃-1-(4-AR₁-4-AR₂-BUTYL)-4-HYDROXY-PIPERIDINES
Hubert Karel Frans Hermans, Beerse, and Carlos Jan Ernest Josef Niemegeers, Deurne, Belgium, assignors to Janssen Pharmaceutica N.V.
No Drawing. Filed Sept. 3, 1969, Ser. No. 855,016
Int. Cl. C07d 29/16
U.S. Cl. 260—294.7                                        7 Claims

ABSTRACT OF THE DISCLOSURE

Compounds useful as neuroleptic agents defined as 4-aryl-1-(4,4-diaryl-butyl)-4-hydroxy-piperidines.

BACKGROUND OF THE INVENTION

The invention pertains to the field of substituted piperidines having central nervous system depressant activity similar to the neuroleptic activity of butyrophenones such as haloperidol. Such butyrophenones, among others, are disclosed in U.S. Pat. No. 3,438,991.

SUMMARY

An object of this invention is to provide a new class of substituted piperidines, in particular, 4-aryl-4-hydroxy-piperidines having certain 4,4-diarylbutyl substituents in the 1-position. Said substituted piperidines may be used alone or in combination with other therapeutically active psychotropic agents and, accordingly, they are valuable agents as central nervous system depressants.

DESCRIPTION OF THE PREFERRED EMBODIMENTS

The novel 4-aryl-1-(4,4-diaryl-butyl) - 4 - hydroxy-piperidines of this invention may be structurally represented by the formula:

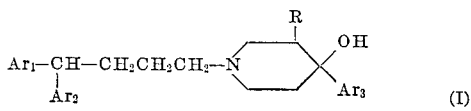

(I)

wherein R is a member selected from the group consisting of hydrogen and methyl; Ar₁ is halophenyl, preferably fluorophenyl; Ar₂ is a member selected from the group consisting of phenyl and halophenyl, preferably fluorophenyl; and Ar₃ is a member selected from the group consisting of phenyl, lower alkylphenyl, trifluoromethylphenyl, halophenyl, dihalophenyl, lower alkyl-halophenyl and trifluoromethylhalophenyl. The pharmacologically active acid addition salts of compounds (I) are also included within the scope of this invention.

Among the preferred species herein are those wherein Ar₁ and Ar₂ are each fluorophenyl and R is hydrogen. The most preferred species, because of their particularly long duration of neuroleptic activity, are those wherein Ar₁ and Ar₂ are each p-fluorophenyl, R is hydrogen and Ar₃ is a member selected from the group consisting of trifluoromethylphenyl, dihalophenyl, preferably dichlorophenyl, and trifluoromethyl-halophenyl, preferably trifluoromethyl-chlorophenyl.

As used herein, "lower alkyl" may be straight or branch chained saturated hydrocarbons having from 1 to about 5 carbon atoms, such as, for example, methyl, ethyl, propyl, isopropyl, butyl, pentyl and the like; and "halo" refers to halogens of atomic weight less than 127, i.e., fluoro, bromo, chloro and iodo.

The subject compounds (I) are prepared by the condensation of an appropriately selected reactive ester of a diaryl butanol of the formula (Ar₁)(Ar₂)CH—CH₂CH₂CH₂—OH such as a halo compound of the formula:

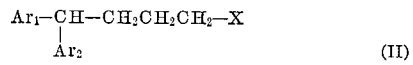

(II)

wherein Ar₁ and Ar₂ are as previously described and X is halo, e.g. iodo, bromo and chloro, with an appropriate 4-aryl-4-hydroxypiperidine of the formula:

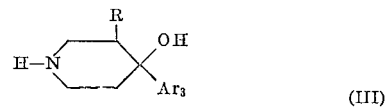

(III)

wherein R and Ar₃ are as previously described. The condensation reaction, preferably under reflux conditions, is carried out in a suitable organic solvent such as a lower alkanol, a lower alkanone, preferably 4-methyl-2-pentanone, or an aromatic hydrocarbon such as benzene, toluene, xylene and the like. Since during the condensation an equivalent of acid (HX) is liberated, it is desirable to use an appropriate amount of a suitable base, e.g., an alkali metal carbonate, to combine with the acid released. The presence of a catalytic amount of potassium iodide is also desirable.

The compounds of Formula I in which R represents a methyl group can obviously occur in stereochemical arrangements in which said methyl group is in a position cis or trans to the 4-hydroxy group. Without attempting to identify which isomer is cis or trans, the nomenclature for the subject compounds I where applicable throughout this application, has been simplified by referring to that isomer which first precipitates out under the conditions employed as the "α form" and the other isomer as the "β form."

The organic bases of Formula I may be converted to the corresponding pharmaceutically acceptable acid addition salts by reaction with an appropriate inorganic acid, such as, for example, hydrochloric, hydrobromic, hydriodic, sulfuric and the like acids, or with an appropriate organic acid, such as, for example, acetic, propionic, glycolic, lactic, oxalic, malonic, tartaric, citric, sulfamic, ascorbic, cyclohexanesulfamic and the like acids. In turn, the salts of Formula I may be converted to the corresponding base form by conventional treatment with suitable alkali.

Several of the 4-aryl-4-hydroxy-piperidines of Formula III are known in the literature (see U.S. Pat. No. 3,438,-991). In general, they may be prepared by the reaction of an appropriate 1-(lower alkoxy)carbonyl-4-piperidone (IV), preferably wherein the lower alkoxy function is methoxy or ethoxy, with an appropriate phenyl-magnesium halide (V) under Grignard conditions. The protecting group in the 1-position of the thus-obtained 1-(lower alkoxy)carbonyl-4-Ar₃-4-hydroxypiperidine (VI) is then removed by heating the latter with a suitable alkali, e.g., potassium hydroxide, to give the desired starting compound (III). The foregoing condensation reaction may be illustrated by the following reaction scheme:

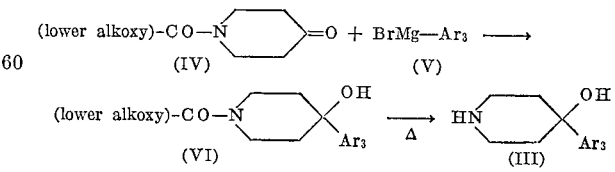

Alternatively, 1-benzyl-4-piperidone may be condensed with (IV) and the thus-obtained 1-benzyl-4-Ar₄-4-hydroxy-piperidine is then debenzylated, for example, by hydrogenation over palladium-on-charcoal, to give the desired starting compound (III).

The novel piperidines (I) of this invention and the therapeutically active acid addition salts thereof have useful pharmacological and pharmaceutical properties and applications in view of their central nervous system depressant activity. More specifically, these compounds are potent neuroleptic agents, and although they are qualitatively similar in their activity to the well known neuroleptic agent, 1-[γ-(4-fluorobenzoyl)propyl]-4-(4-chlorophenyl) piperidin-4-ol, generically known as haloperidol, they differ significantly from the latter in their long duration of action. Neuroleptic drugs are known to block apomorphine-induced vomiting in dogs. In the anti-apomorphine test [see "Method 1" in Janssen, P. A. J. et al., Arzneim.-Forsch., 15, 1196 (1965)], the compound to be tested is given orally followed at different time intervals thereafter by the standard dose of apomorphine (0.31 mg./kg. s.c.) which will induce vomiting in untreated dogs. Anti-apomorphine activity is demonstrated with the subject compounds (I) and salts thereof at oral dose levels of about 0.005 to more than 40 mg./kg. body weight. The $ED_{50}$ value (in mg./kg.) is the oral dose level of the tested compound protecting 50% of the animals from emesis. The particularly long duration of activity of the most preferred compounds described heretofore in comparison to haloperidol is demonstrated by the following data:

APOMORPHINE ANTAGONISM IN DOGS

| Time after oral dose | $ED_{50}$-values in mg./kg. orally | | | |
|---|---|---|---|---|
| | Compound A [1] | Compound B [2] | Compound C [3] | Haloperidol |
| 12 hours | 0.08 | 0.02 | 0.030 | 0.06 |
| 1 day | 0.095 | 0.025 | 0.030 | 0.16 |
| 2 days | 0.12 | 0.055 | 0.037 | 0.60 |
| 3 days | 0.16 | 0.095 | 0.046 | >1.25 |
| 4 days | 0.20 | 0.13 | 0.056 | >1.25 |
| 5 days | 0.26 | 0.16 | 0.065 | |
| 6 days | >0.30 | >0.20 | 0.076 | |
| 7 days | >0.30 | >0.20 | 0.090 | |

[1] 1-[4,4-di-(4-fluoro-phenyl)-butyl]-4-hydroxy-4-(3,4-dichloro-phenyl)-piperidine.
[2] 1-[4,4-bis(p-fluorophenyl)butyl]-4-(α,α,α-trifluoro-m-tolyl)-4-piperidinol.
[3] 4-(4-chloro-α,α,α-trifluoro-m-tolyl)-1-[4,4-bis(p-fluorophenyl)butyl]-4-piperidinol.

Due to the available asymmetric carbons present in the subject compounds (I), it is evident that their existence in the form of stereochemical isomers (enantiomorphs) is possible. If desired, the resolution and isolation or the production of a particular form can be accomplished by application of general principles known in the art. Said enantiomorphs are naturally intended to be included within the scope of this invention.

The following examples are intended to illustrate the scope of the present invention. Unless otherwise stated, all parts are by weight.

Example I

To a stirred mixture of 4.3 parts 4-(4-chloro-phenyl)-4-hydroxy-piperidine, 3.2 parts sodium carbonate, a few crystals of potassium iodide in 160 parts 4-methyl-2-pentanone is added dropwise a solution of 5.8 parts 1-chloro-4-(4-fluoro-phenyl)-4-phenyl-butane in 40 parts 4-methyl-2-pentanone. After the addition is complete, the whole is stirred and refluxed for 45 hours. After cooling, the reaction mixture is treated with 50 parts water. The organic layer is separated, dried over potassium carbonate, filtered and evaporated. The oily residue solidifies on treating with diisopropylether. The solid is filtered off and dried, yielding 4 - (4-chloro-phenyl)-1-[4-(4-fluoro-phenyl)-4-phenyl-butyl]-4-hydroxy-piperidine; M.P. 108–108.5° C.

Example II

A mixture of 7.3 parts 1-chloro-4,4-di-(4-fluoro-phenyl) - butane, 4.2 parts 4-(4-chloro-phenyl)-4-hydroxy-piperidine, 4 parts sodium carbonate, a few crystals of potassium iodide in 200 parts 4-methyl-2-pentanone is stirred and refluxed for 60 hours. After cooling the reaction mixture, there are added 150 parts water. The organic layer is separated, dried over potassium carbonate, filtered and evaporated. The oily residue is dissolved in diethyl-ether and gaseous hydrogen chloride is introduced into the solution: an oily hydrochloride is obtained. The solvent is decanted and the oily residue solidifies on boiling for 15 minutes in 200 parts water, yielding crude 4-(4-chloro-phenyl) - 1 - [4,4-di-(4-fluoro-phenyl)-butyl] - 4-hydroxy-piperidine hydrochloride. This crop is recrystallized from a mixture of 16 parts 2-propanol and 20 parts water. This recrystallized product is dissolved, while heating, in 8 parts methanol and to this warm solution is added anhydrous ether until a turbid solution is obtained. After cooling to room temperature, the formed solid is filtered off and dried, yielding 4-(4-chloro-phenyl)-1-[4,4-di-(4-fluoro-phenyl)-butyl] - 4 - hydroxy-piperidine hydrochloride: M.P. 182–183° C.

Example III

A mixture of 6.1 parts of 1-chloro-4,4-di-(4-fluoro-phenyl)-butane, 4.4 parts of 4-hydroxy-4-(3-chloro-4-methyl-phenyl)-piperidine, 3.2 parts of sodium carbonate, a few crystals of potassium iodide in 200 parts of 4-methyl-2-pentanone is stirred and refluxed for 60 hours. After cooling the reaction mixture there is added 150 parts of water. The organic layer is separated, dried, filtered and evaporated. The oily residue is crystallized from a mixture of benzene and petroleum ether. The solid is filtered off and dried, yielding 1-[4,4-di-(4-fluoro-phenyl)-butyl] - 4 - hydroxy-4-(3-chloro-4-methyl-phenyl)-piperidine; M.P. 117–118° C.

Example IV

A mixture of 6.1 parts of 1-chloro-4,4-di-(4-fluoro-phenyl)-butane, 5 parts of 4-hydroxy-4-(3,4-dichloro-phenyl)-piperidine, 3.2 parts of sodium carbonate, a few crystals of potassium iodide in 200 parts of 4-methyl-2-pentanone is stirred and refluxed for 72 hours. After cooling there is added 100 parts of water. The organic layer is separated, dried, filtered and evaporated. The oily residue solidifies on treating in a mixture of diisopropylether/hexane. The solid is filtered off and recrystallized from a mixture of benzene/petroleum ether, yielding 1-[4,4-di-(4-fluoro-phenyl)-butyl] - 4 - hydroxy-4-(3,4-dichloro-phenyl)-piperidine; M.P. 115–116.5° C.

Example V

A mixture of 6.1 parts of 1-chloro-4,4-di-(4-fluoro-phenyl)-butane, 4.4 parts of 4-hydroxy-4-(3-methyl-4-chloro-phenyl)-piperidine, 3.2 parts of sodium carbonate, a few crystals of postassium iodide in 200 parts of 4-methyl-2-pentanone is stirred and refluxed for 72 hours. After cooling there is added 150 parts of water. The organic layer is separated, dried, filtered and evaporated. The oily residue is crystallized from diisopropylether. The precipitated product is filtered off and dried, yielding 1-[4,4-di-(4 - fluoro-phenyl)-butyl]-4-hydroxy-4-(3-methyl-4-chloro-phenyl)-piperidine; M.P. 135.5–137° C.

Example VI

A mixture of 6.18 parts of 4,4-bis(p-fluorophenyl)-butylchloride, 3.9 parts of 4-(p-fluorophenyl)-4-piperidinol, 3.2 parts of sodium carbonate, a few crystals of potassium iodide in 200 parts of 4-methyl-2-pentanone is stirred and refluxed for 2 days. The reaction mixture is cooled and 150 parts of water is added. The organic layer is separated, dried, filtered and evaporated. From the oily free base, the oxalate salt is prepared by conventional treatment with oxalic acid in 2-propanol, yielding 4-(p-fluorophenyl)-1-[4,4-bis(p - fluorophenyl)butyl]-4-piperidinol oxalate; M.P. 176° C.

Example VII

A mixture of 6.2 parts of 4,4-bis(p-fluorophenyl)-butylchloride, 5.6 parts of 4-(α,α,α-trifluoro-m-tolyl)-4-piperidinol, 5.3 parts of sodium carbonate, a few crystals of potassium iodide in 200 parts of 4-methyl-2-pentanone is stirred and refluxed for 60 hours. The reaction mixture is cooled and 150 parts of water is added. The organic layer is separated, dried, filtered and evaporated. The oily residue solidifies on standing and is crystallized from a mixture of diisopropylether and petroleumether, yielding 1-[4,4-bis(p - fluorophenyl)butyl] - 4 - (α,α,α-trifluoro-m-tolyl)-4-piperidinol; M.P. 108° C.

Example VIII

A mixture of 6.18 parts of 4,4-bis(p-fluorophenyl)-butylchloride, 3.82 parts of 4-p-tolyl-4-piperidinol, 3.2 parts of sodium carbonate, a few crystals of potassium iodide in 200 parts of 4-methyl-2-pentanone is stirred and refluxed for 2 days. The reaction mixture is cooled and water is added. The organic layer is separated, dried, filtered and evaporated. From the oily free base, the oxalate salt is prepared by conventional treatment with oxalic acid in 2-propanol, yielding 1-[4,4-bis(p-fluorophenyl)butyl] - 4 - p-tolyl-4-piperidinol oxalate; M.P. 180° C.

Example IX

A mixture of 6.2 parts of 4,4-bis(p-fluorophenyl)butyl chloride, 5.1 parts of 4-(p-bromophenyl)-4-piperidinol, 3.2 parts of sodium carbonate, a few crystals of potassium iodide in 200 parts of 4-methyl-2-pentanone is stirred and refluxed for 60 hours. The reaction mixture is cooled and 150 parts of water is added. The organic layer is separated, dried, filtered and evaporated. The residue is dissolved in anhydrous diisopropylether and boiled with activated charcoal. The latter is filtered off and the filtrate is evaporated. From the oily free base, the oxalate salt is prepared by conventional treatment with oxalic acid in 2-propanol, yielding 4-(p-bromophenyl)-1-[4,4-bis(p-fluorophenyl)butyl]-4-piperidinol oxalate; M.P. 194.5° C.

Example X

A mixture of 24.7 parts of 4,4-bis(p-fluorophenyl)butyl chloride, 14.2 parts of 4-phenyl-4-piperidinol, 12.8 parts of sodium carbonate, a few crystals of potassium iodide in 480 parts of 4-methyl-2-pentanone is stirred and refluxed for 60 hours. The reaction mixture is cooled and water is added. The organic layer is separated, dried, filtered and evaporated. The residue is crystallized from diisopropylether, yielding 1-[4,4-bis(p-fluorophenyl)butyl]-4-phenyl-4-piperidinol; M.P. 112° C.

Example XI

A mixture of 24.7 parts of 4,4-bis(p-fluorophenyl)butyl chloride, 16.9 parts of 4-(p-chlorophenyl)-4-piperidinol, 12.8 parts of sodium carbonate, a few crystals of potassium iodide in 480 parts of 4-methyl-2-pentanone is stirred and refluxed for 60 hours. The reaction mixture is cooled and 150 parts of water is added. The organic layer is separated, dried, filtered and evaporated. The residue is crystallized from diisopropylether, yielding 4 - (p-chlorophenyl) - 1 - [4,4 - bis(p-fluorophenyl)butyl] - 4 - piperidinol; M.P. 120.5° C.

Example XII

A mixture of 24.7 parts of 4,4-bis(p-fluorophenyl)butyl chloride, 15.3 parts of 4 - (p-tolyl)-4-piperidinol, 12.5 parts of sodium carbonate, a few crystals of potassium iodide in 480 parts of 4-methyl-2-pentanone is stirred and refluxed for 60 hours. The reaction mixture is cooled and 150 parts of water is added. The organic layer is separated, dried, filtered and evaporated. The oily residue is crystallized from diisopropylether, yielding 1-[4,4-bis(p - fluorophenyl)butyl] - 4 - p - tolyl - 4 - piperidinol; M.P. 115.5° C.

Example XIII

A mixture of 24 parts of 4,4-bis(p-fluorophenyl)butyl chloride, 20.9 parts of 4-(4-chloro-α,α,α-trifluoro-m-tolyl)-4-piperidinol, 13.8 parts of sodium carbonate, a few crystals of potassium iodide in 600 parts of 4-methyl-2-pentanone is stirred and refluxed for 60 hours. The reaction mixture is cooled and 150 parts of water is added. The organic layer is separated, dried, filtered and evaporated. The oily residue by is crystallized from diisopropylether, yielding 4 - (4-chloro-α,α,α-trifluoro-m-tolyl)-1-[4,4-bis(p-fluorophenyl)butyl]-4-piperidinol; M.P. 106.5° C.

Example XIV

A mixture of 24.64 parts of 4,4-bis(p-fluorophenyl)butyl chloride, 14.16 parts of 4-phenyl-4-piperidinol, 12.8 parts of sodium carbonate, a few crystals of potassium iodide in 600 parts of 4-methyl-2-pentanone is stirred and refluxed for 2 days. The reaction mixture is cooled and 150 parts of water is added. The organic layer is separated, dried, filtered and evaporated. The solid free base is crystallized from ether and then converted into its hydrochloride salt by treatment with HCl in the conventional manner. The crude salt is crystallized from 4-methyl-2-pentanone, yielding 1 - [4,4-bis(p-fluorophenyl)-butyl]-4-phenyl-4-piperidinol hydrochloride; M.P. 161° C.

Example XV

A mixture of 24.64 parts of 4,4-bis(p-fluorophenyl) butyl chloride, 15.28 parts of 4 - (p-tolyl)-4-piperidinol, 12.8 parts of sodium carbonate, a few crystals of potassium iodide in 480 parts of 4-methyl-2-pentanone is stirred and refluxed for 2 days. The reaction mixture is cooled and 150 parts of water is added. The organic layer is separated, dried, filtered and evaporated. The solid free base is crystallized from diisopropylether, filtered off again and then converted into its hydrochloride salt by treatment with HCl in the conventional manner. After crystallization of the crude solid salt from 4-methyl-2-pentanone, 1 - [4,4 - bis(p-fluorophenyl)butyl] - 4 -p-tolyl-4-piperidinol hydrochloride is obtained; M.P. 177° C.

Example XVI

A mixture of 17.8 parts of 4,4-bis(p-fluorophenyl)butyl chloride, 12 parts of 4-(4-chloro-m-tolyl)-4-piperidinol, 10.6 parts of sodium carbonate, a few crystals of potassium iodide in 480 parts of 4-methyl-2-pentanone is stirred and refluxed for 60 hours. The reaction mixture is cooled and 150 parts of water is added. The organic layer is separated, dried, filtered and evaporated. The solid free base is crystallized from a mixture of diisopropylether and acetone (5:1 by volume). From the pure free base, the hydrochloride salt is prepared in diisopropylether and acetone, yielding, after crystallization of the crude salt from 4 - methyl - 2 - pentanone, 4 - (4 - chloro-m-tolyl) -1-[4,4 - bis(p-fluorophenyl)butyl] - 4 piperidinol hydrochloride; M.P. 166.5° C.

Example XVII

Through a soltuion of 26 parts of 4 - ( 4 - chloro-α,α,α - trifluoro-m-tolyl) - 1 - [4,4 - bis(p-fluorophenyl)butyl] - 4 - piperidinol in diisopropylether is introduced gaseous hydrogen chloride. The precipitated solid salt is filtered off and crystallized twice: first from a mixture of acetonitrile and diisopropylether and then from 4-methyl-2-pentanone, yielding 4 - (4-chloro-α,α,α-trifluoro-m-tolyl) - 1-[4,4-bis(p-fluorophenyl)butyl]-4-piperidinol hydrochloride; M.P. 166° C.

Example XVIII 25.5 parts of 4 - (3,4 - dichlorophenyl)-1-[4,4-bis(p-fluorophenyl)butyl]-4-piperidinol are dissolved in diisopropylether and boiled with activated charcoal. The latter is filtered off and through the solution, gaseous hydrogen chloride is introduced. The precipitated solid salt is filtered off and crystallized from 4-methyl-2-pentanone, yielding 4-(3,4-dichlorophenyl)-1[4,4-bis(p-fluorophenyl)butyl]-4-piperidinol hydrochloride; M.P. 166° C.

Example XIX

A mixture of 18.5 parts of 4,4-bis(p-fluorophenyl) butyl chloride, 16.9 parts of 4-(α,α,α-trifluoro-m-tolyl)-4-piperidinol hydrochloride, 21.2 parts of sodium carbonate, a few crystals of potassium iodide in 560 parts of 4-methyl-2-pentanone is stirred and refluxed for 60 hours. The reaction mixture is cooled and 150 parts of water is added. The organic layer is separated, dried, filtered and evaporated. The oily residue is dissolved in diisopropylether, boiled with activated charcoal, filtered and the filtrate is evaporated again. The solid residue is crystallized from a mixture of diisopropylether and petroleumether. The crystallized product is dissolved in diisopropylether and gaseous hydrogen chloride is introduced into the solution. The precipitated salt is filtered off and crystallized from a mixture of 4-methyl-2-pentanone and diisopropylether, yielding 1 - [4,4 - bis(p-fluorophenyl) butyl] - 4 - ($\alpha,\alpha,\alpha$-trifluoro-m-tolyl)-4-piperidinol hydrochloride; M.P. 151.5° C.

Example XX

A mixture of 24.64 parts of 4,4-bis(p-fluorophenyl) butyl chloride, 15.6 parts of 4-(p-fluorophenyl)-4-piperidinol, 12.8 parts of sodium carbonate, a few crystals of potassium iodide in 800 parts of 4-methyl-2-pentanone is stirred and refluxed for 48 hours. The reaction mixture is cooled and treated with 150 parts of water. The organic layer is separated, dried, filtered and evaporated. The residue is taken up in diisopropylether, boiled with activated charcoal, filtered and the filtrate is allowed to crystallize. The precipitated product is filtered off and recrystallized from diisopropylether and petroleumether, yielding 4 - (p - fluorophenyl)-1-[4,4-bis(p-fluorophenyl)butyl]-4-piperidinol; M.P. 104.5° C.

Example XXI

A mixture of 24.64 parts of 4,4-bis(p-fluorophenyl) butyl chloride, 15.6 parts of 4-(p-fluorophenyl)-4-piperidinol, 12.8 parts of sodium carbonate, a few crystals of potassium iodide in 800 parts of 4-methyl-2-pentanone is stirred and refluxed for 48 hours. The reaction mixture is cooled and 150 parts of water is added. The organic layer is separated, dried, filtered and evaporated. The residue is taken up in diisopropylether and boiled with activated charcoal. The latter is filtered off and the filtrate is allowed to crystallize. The precipitated product is filtered off and dissolved in diisopropylether. Then gaseous hydrogen chloride is introduced into the solution. The precipitated solid salt is filtered off and recrystallized from 4-methyl-2-pentanone, yielding 4-(p-fluorophenyl)-1-[4,4-bis(p - fluorophenyl)butyl]-4-piperidinol hydrochloride; M.P. 141° C.

Example XXII

A mixture of 24.64 parts of 4,4-bis(p-fluorophenyl) butyl chloride, 22 parts of 4-(p-bromophenyl)-4-piperidinol, 12.8 parts of sodium carbonate, a few crystals of potassium iodide in 800 parts of 4-methyl-2-pentanone is stirred and refluxed for 2 days. The reaction mixture is cooled and 150 parts of water is added. The organic layer is separated, dried, filtered and evaporated. The residue is triturated in diisopropylether and the solid product is filtered off, yielding 4-(p-bromophenyl)-1-[4,4-bis(p-fluorophenyl)butyl]-4-piperidinol; M.P. 122.5° C.; M.P. of HCl salt, 182° C.

Example XXIII

A mixture of 1135 parts of dimethyl 3,3'-(benzylimino)-dipropionate, 42.4 parts of sodium carbonate and 1800 parts of chloroform is stirred at room temperature and there are added dropwise 412 parts of methyl chloroformate over a period of about 30 minutes (exothermic reaction: cooling is necessary to keep the temperature below 45° C.). After the addition is complete, the whole is further stirred overnight at room temperature. Then 300 parts of water are added. The chloroform layer is separated, dried, filtered and evaporated, yielding methyl N,N - bis[2 - (methoxycarbonyl)ethyl]carbamate as a residue.

A vessel is charged with 250 parts of sodium methoxide solution 30% and 480 parts of xylene and methanol is distilled till a temperature of 75° C. is reached. Then there are added dropwise 250 parts of methyl N, N-bis[2-(methoxycarbonyl)ethyl]carbamate, and during this addition the methanol is distilled off. After the addition is complete, distillation of the methanol is continued till an internal temperature of about 125° C. is reached. The residue is stirred and refluxed for one hour. After cooling, there are added 85 parts of acetic acid in 100 parts of water (dropwise). The xylene phase is separated, washed with water, dried and evaporated. The oily residue is distilled, yielding dimethyl 4 - oxo - 1,3-piperidinedicarboxylate; B.P. 133–135° C. at 0.4 mm. pressure; $n_D^{20}$: 1.5015; $d_{20}^{20}$: 1.2648.

To a stirred mixture of 22 parts of sodium hydride 54.5% in 270 parts of anhydrous tetrahydrofuran is added dropwise a solution of 107.6 parts of dimethyl 4 - oxo-1,3-piperidinedicarboxylate in 180 parts of anhydrous tetrahydrofuran (exothermic reaction: temperature rises from 20° C. to 48° C.). After the addition is complete, the whole is stirred for 2.5 hours at room temperature. Then there are added at once 142 parts of methyl iodide and the whole is heated to a temperature of about 60° C. After stirring for 20 hours at 60° C., the reaction mixture is cooled and filtered. The filter-cake is washed with tetrahydrofuran and the filtrate is evaporated. The residue is stirred in 1000 parts of toluene, filtered and the filtrate is evaporated. The oily residue is distilled, yielding dimethyl 3-methyl-4-oxo-1,3-piperidinedicarboxylate; B.P. 122° C. at 0.4 mm. pressure.

740 parts of a solution of oxalic acid dihydrate in water (140 parts of oxalic acid dihydrate in 1000 parts of water) are stirred and refluxed for 24 hours together with 84.8 parts of dimethyl 3-methyl-4-oxo-1,3-piperidinedicarboxylate. Water is evaporated till dry. The precipitate is shaken thoroughly with toluene, filtered off and stirred in toluene. The toluene phase is filtered off, dried and evaporated. The oily residue is distilled, yielding methyl 3-methyl-4-oxo-1-piperidinecarboxylate; B.P. 136–137.5° C. at 10 mm. pressure.

Example XXIV

A solution of p-chlorophenyl magnesiumbromide is prepared in the conventional manner, starting from 6 parts of magnesium, 48 parts of p-chlorobromobenzene and 225 parts of anhydrous tetrahydrofuran. To this solution is added dropwise a solution of 34.5 parts of methyl 3-methyl-4-oxo-1-piperidinecarboxylate in 55 parts of anhydrous tetrahydrofuran while stirring and refluxing. Upon completion, the heating source is removed and the whole is stirred for one hour. The reaction mixture is poured onto a mixture of 15 parts of acetic acid and crushed ice and the product is extracted with methylene chloride. The extract is dried, filtered and evaporated. The residue is crystallized from 2-propanol, yielding methyl 4-(p-chlorophenyl) - 4 - hydroxy - 3-methyl - 1-piperidinecarboxylate; M.P. 137° C.

A mixture of 32 parts of methyl 4-(p-chlorophenyl)-4-hydroxy - 3 - methyl-1-piperidinecarboxylate, 32 parts of potassium hydroxide and 600 parts of 2-propanol is stirred and refluxed for 48 hours. Then water is added and the reaction mixture is filtered. The solvent is evaporated and the aqueous phase is extracted with chloroform. The extract is dried, filtered and evaporated. The residue is crystallized several times from diisopropylether, yielding $\alpha,dl$ - 4 - (p - chlorophenyl) - 3-methyl-4-piperidinol; M.P. 128.5° C.

A mixture of 7 parts of $\alpha,dl$-4-(p-chlorophenyl)-3-methyl-4-piperidinol, 10.6 parts of sodium carbonate and 320 parts of 4-methyl-2-pentanone is distilled azeotropically to dry and there are added 10.5 parts of 4,4-bis(p-fluorophenyl)butylchloride. The whole is stirred and refluxed for 2 days. Then another portion of 5 parts of 4,4-bis(p-fluorophenyl)butylchloride is added and stirring and refluxing is continued overnight. The reaction mixture is filtered hot over charcoal and evaporated. The residue is dissolved in diisopropylether and after crystallization of the filtrate at room temperature, $\alpha,dl$-4-(p-chlorophenyl)-

1 - [4,4 - bis(p-fluorophenyl)butyl]-3-methyl-4-piperidinol is obtained; M.P. 146° C.

Example XXV

To a stirred and refluxing solution of m-trifluoromethylphenyl magnesium bromide, previously prepared, starting from 30 parts of magnesium and 281 parts of m-trifluoromethylphenyl bromide in 920 parts of tetrahydrofuran, are added dropwise 171 parts of methyl 3-methyl-4-oxo-1-piperidinecarboxylate. Upon completion, stirring is continued for one hour at room temperature. The reaction mixture is poured onto 75 parts of glacial acetic acid and crushed ice. The product is extracted with methylene chloride. The extract is dried, filtered and evaporated. The residue is crystallized twice from diisopropylether, yielding dl - methyl 4 - (m - trifluoromethylphenyl)-4-hydroxy-3-methyl-1-piperidinecarboxylate; M.P. 113.5° C.

A mixture of 689 parts of dl-methyl 4-(m-trifluoromethylphenyl) - 4-hydroxy - 3-methyl-1-piperidinecarboxylate, 689 parts of potassium hydroxide and 3200 parts of 2-propanol is stirred and refluxed for 2 days. Water is added and the 2-propanol is evaporated. From the aqueous phase, the solid is filtered off (mainly α-dl-fraction) and the filtrate is evaporated. The residue is dissolved in tetrahydrofuran and the solution is acidified with concentrated nitric acid. The precipitated nitrate salt is filtered off, dissolved in water and alkalized with ammonium hydroxide. The free base is extracted with chloroform. The extract is dried, filtered and evaporated. After recrystallization of the residue from diisopropylether, β-dl-4-(m-trifluoromethylphenyl)-3-methyl-4-piperidinol is obtained; M.P. 157.5° C.

A mixture of 4 parts of β-dl-4-(m-trifluoromethylphenyl)-3-methyl-4-piperidinol, 3.5 parts of sodium carbonate and 240 parts of 4-methyl-2-pentanone is distilled azeotropically to dry. Then there are added dropwise 5.5 parts of 4,4-bis(p-fluorophenyl)-butylchloride and the whole is stirred and refluxed for 72 hours. Another portion of 2 parts of 4,4-bis-(p-fluorophenyl)-butylchloride is added and stirring at reflux temperature is continued for 24 hours. The reaction mixture is filtered hot and the filtrate is evaporated. The oily residue is dissolved in a mixture of diisopropylether and 2-propanol and this solution is acidified with an excess of 2-propanol previously saturated with gaseous hydrogen chloride. The salt is crystallized at room temperature. It is filtered off, dried in vacuo and recrystallized from a mixture of diisopropylether and 2-propanol, yielding β-dl-1-[4,4-bis(p-fluorophenyl)butyl] - 4 - (m-trifluoromethylphenyl)-3-methyl-4-piperidinol hydrochloride hydrate; M.P. 113.5° C.

Example XXVI

Starting from 5.84 parts of magnesium, 62.3 parts of 4-chloro-3-trifluoromethyl-phenylbromide and 115 parts of tetrahydrofuran, the Grignard agent, 4-chloro-3-trifluoromethyl-phenyl magnesium bromide, is formed in the conventional manner. To this stirring and hot (60° C.) solution is added dropwise a solution of 34.2 parts of methyl 3-methyl-4-oxo-1-piperidinecarboxylate in 135 parts of tetrahydrofuran. Upon completion, the reaction mixture is cooled to room temperature, while stirring. It is poured onto a mixture of crushed ice and glacial acetic acid. The aqueous phase is separated and extracted with chloroform. The combined organic layers are dried, filtered and evaporated. The oily residue is crystallized from diisopropylether, yielding methyl 4-(4-chloro-3-trifluoromethylphenyl) - 4 - hydroxy - 3 - methylpiperidine-1-carboxylate; M.P. 124.6–147.6° C.

A mixture of 444 parts of methyl 4-(4-chloro-3-trifluoromethyl - phenyl) - 4 - hydroxy-3-methylpiperidine-1-carboxylate, 819 parts of potassium hydroxide 85% and 2400 parts of 2-propanol is stirred and refluxed overnight. The reaction mixture is evaporated. The residue is taken up in water, whereupon two layers are separated. The aqueous phase is extracted with chloroform. The combined organic layers are washed with water, dried, filtered and evaporated. The residue is poured onto water and hydrochloric acid. The formed precipitate is filtered off, triturated in diisopropylether, filtered off again and dried, yielding 170 parts of crude product. This fraction is dissolved in boiling water. Upon cooling and alkalinization, an oil is precipitated. The latter is crystallized from toluene, yielding 133 parts of the crude free base. After drying at 85° C. and crystallization from ethyl acetate, the fraction is dissolved in 4-methyl-2-pentanone. The solution is acidified with 2-propanol/HCl, whereupon the hydrochloride salt is precipitated. It is filtered off, dried and crystallized twice from 2-propanol, yielding α-(±)-4-(4-chloro - 3 - trifluoromethyl-phenyl)-3-methyl-4-piperidinol hydrochloride; M.P. 260.6–262.5° C.

A mixture of 11.5 parts of 4,4-bis(p-fluorophenyl)-butyl chloride, 9.9 parts of α-(±)-4-(4-chloro-3-trifluoromethylphenyl)-3-methyl-4-piperidinol hydrochloride, 6.4 parts of sodium carbonate and 160 parts of 4-methyl-2-pentanone is stirred and refluxed for 55 hours. The reaction mixture is filtered hot and the filtrate is evaporated. The oily residue is dissolved in diisopropylether. On keeping the solution at room temperature, the product is crystallized. It is filtered off and recrystallized from diisopropylether, yielding α-(±)-4-(4-chloro-3-trifluoromethylphenyl) - 1 - [4,4 - bis(p-fluorophenyl)-butyl]-3-methyl-4-piperidinol; M.P. 96.2° C.

Example XXVII

A mixture of 6 parts of α-4-(m-trifluoromethylphenyl)-3-methyl-4-piperidinol (M.P. 122.5–123.2° C.), 10.6 parts of sodium carbonate, a few crystals of potassium iodide in 200 parts of 4-methyl-2-pentanone is azeotropically distilled to dry. Then there are added dropwise 8.5 parts of 4,4-bis(p-fluorophenyl)butylchloride and the whole is stirred and refluxed for 24 hours. The reaction mixture is cooled, filtered and evaporated. From the oily free base, the hydrochloride salt is prepared in the conventional manner in diisopropylether and acetone. The precipitated solid salt is filtered off, boiled in water, filtered off again and after recrystallization from 2-propanol, α-1-[4,4-bis-(p - fluorophenyl)butyl] - 4-(m-trifluoromethylphenyl)-3-methyl-4-piperidinol hydrochloride is obtained; M.P. 157.5° C.

Example XXVIII

A solution of 30 parts of tartaric acid in 80 parts of acetone and 80 parts of methanol is added to a solution of 52 parts of α-dl-4-(m-trifluoromethylphenyl)-3-methyl-4-piperidinol in 80 parts of acetone and 80 parts of methanol and the whole is allowed to crystallize. The precipitated tartrate is filtered off (filtrate is set aside) and recrystallized three times from a mixture of ethanol and 2-propanol. From the tartrate salt, the free base is liberated in the conventional manner, dried and recrystallized three times from a mixture of ethanol and 2-propanol, till constant rotation, yielding α-(—)-4-m-trifluoromethylphenyl)-3-methyl-4-piperidinol; M.P. 153.5° C.; $\alpha_D^{20}$: —8° (1% in acetone).

The filtrate which was set aside is evaporated. From the residue (tartrate salt), the free base is liberated and dried. The resulting free base is converted again into the dibenzoyl tartaric acid salt from which the free base is liberated once more. After drying, α-(+)-4-(m-trifluoromethylphenyl)-3-methyl-4-piperidinol is obtained; M.P. 153.5° C.; $\alpha_D^{20}$: +8° (1% in acetone).

Example XXIX

A mixture of 13 parts of α-(—)-4-(m-trifluoromethylphenyl)-3-methyl-4-piperidinol, 9.5 parts of sodium carbonate and 240 parts of 4-methyl-2-pentanone is distilled to dry azeotropically. Then there are added dropwise 21 parts of 4,4-bis(p-fluorophenyl)butylchloride and the whole is stirred and refluxed for 48 hours. The reaction mixture is filtered warm and the filtrate is evaporated. The oily free base is suspended in diluted hydrochloric acid solution and extracted with chloroform. The chloroform solution is dried, filtered and evaporated. The residue is dissolved in a mixture of 4-methyl-2-pentanone and diisopropylether and the product is crystallized at room temperature, yielding α-(−)-1 - [4,4 - bis(p - fluorophenyl)-butyl]-4-(m-trifluoromethylphenyl)-3-methyl-4 - piperidinol hydrochloride hydrate; M.P. 94.5° C.; $\alpha_D^{20}$: −14° (1% in acetone).

Example XXX

A mixture of 5 parts of α-(+)-4-(m-trifluoromethylphenyl)-3-methyl-4-piperidinol, 5.5 parts of sodium carbonate and 240 parts of 4-methyl-2-pentanone is distilled to dry azeotropically. Then there are added dropwise 6.6 parts of 4,4 - bis(p - fluorophenyl)butylchloride and the whole is stirred and refluxed for 72 hours. After the addition of a second portion of 2 parts of 4,4-bis(p-fluorophenyl)butylchloride, stirring and refluxing is continued for another 24 hours. The reaction mixture is filtered hot and the filtrate is evaporated. The oily free base is dissolved in a mixture of diisopropylether and ethyl acetate and the solution is acidified with 2-propanol previously saturated with gaseous hydrogen chloride. The precipitated solid salt is filtered off and dried, yielding α-(+)-1-[4,4-bis(p-fluorophenyl)butyl]-4-(m-trifluoromethylphenyl)-3-methyl-4-piperidinol hydrochloride hydrate; M.P. 114° C.; $\alpha_D^{20}$: +10° (1% in acetone).

Example XXXI

To a solution of 4-bromo-phenyl magnesiumbromide, prepared in the usual manner starting from 1.2 parts of magnesium and 11.8 parts of p-dibromobenzene in dry ether, is added a solution of 6 parts of 1-(ethoxy-carbonyl)-4-oxo-piperidine in dry ether and the whole is stirred and refluxed for one hour. The resulting complex is cooled and poured into a mixture of glacial acetic acid and crushed ice. The aqueous phase is separated and extracted once more with ether. The etheric phase is washed with water, dried, filtered and evaporated. The oily residue solidifies on scratching. The solid product is filtered off, stirred in a small quantity of toluene, filtered off again and dried, yielding 1-(ethoxy-carbonyl)-4-(4-bromo-phenyl)-4-hydroxypiperidine; which is used without further purification for the preparation of the next step.

A mixture of 4.65 parts of 1-(ethoxy-carbonyl)-4-(4-bromo-phenyl)-4-hydroxy-piperidine, 4.65 parts of potassium hydroxide, 45 parts of 2-propanol and 3 parts of water is stirred and refluxed overnight. After cooling the reaction mixture is poured onto 90 parts of water. Then there is added carefully an equimolar quantity of acetic acid 90%. When no more gas is evolved, the solvent is distilled off (maximum temperature 100° C.). The residue is extracted three times with chloroform. The combined extracts are dried and evaporated in vacuo. The solid residue is recyrstallized from toluene, yielding 4-(4-bromo-phenyl)-4-hydroxy-piperidine.

Example XXXII

A solution of 61 parts 4-chloro-1,1-di-(4-fluoro-phenyl)-1-butene in 400 parts 2-propanol is hydrogenated at normal pressure and at room temperature in the presence of 5.5 parts palladium-on-charcoal catalyst 10% (exothermic reaction: temperature rises to ±30° C.). After the calculated amount of hydrogen is taken up, hydrogenation is stopped. The catalyst is filtered off and the filtrate is evaporated. The oily residue is distilled in vacuo, yielding oily 1-chloro-4,4-di-(4-fluoro-phenyl)-butane; B.P. 166–168° C. at 6 mm. pressure; $n_D^{20}$: 1.5425; $d_{20}^{20}$: 1.2039.

Example XXXIII

A mixture of 90 parts 4-chloro-1-(4-fluoro-phenyl)-1-phenyl-1-butene, 440 parts 2-propanol and 40 parts distilled water is hydrogenated at normal pressure and at a temperature of about 35° C., in the presence of 10 parts palladium-on-charcoal catalyst. After the calculated amount of hydrogen is taken up, hydrogenation is stopped. The whole is boiled for a few minutes. The catalyst is filtered off and the filtrate is evaporated. The oily residue is distilled in vacuo, yielding a first fraction of about 12 parts less pure dl-1-chloro-4-(4-fluoro-phenyl)-4-phenyl-butane; B.P. 135–145° C. at 0.2 mm. pressure and a purer second fraction of about 61 parts dl-1-chloro - 4 - (4-fluoro-phenyl)-4-phenyl-butane; B.P. 145–150° C. at 0.2 mm. pressure; $n_D^{20}$: 1.5578; $d_{20}^{20}$: 1.1447.

We claim:

1. A chemical compound selected from the group consisting of a 4-aryl-1-(4,4-diaryl-butyl)-4-hydroxy-piperidine having the formula:

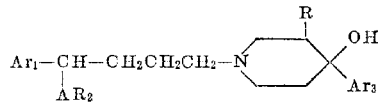

and the therapeutically active acid addition salts thereof, wherein R is a member selected from the group consisting of hydrogen and methyl, $Ar_1$ is halophenyl, $Ar_2$ is a member selected from the group consisting of phenyl and halophenyl, and $Ar_3$ is a member selected from the group consisting of phenyl, lower alkylphenyl, trifluoromethylphenyl, halophenyl, dihalophenyl, lower alkyl-halophenyl and trifluoromethyl-halophenyl.

2. A chemical compound selected from the group consisting of a 4-aryl-1-(4,4-bis-fluorophenyl-butyl)-4-hydroxy-piperidine having the formula:

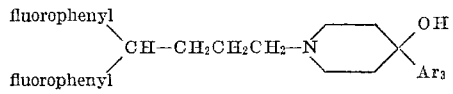

and the therapeutically active acid addition salts thereof, wherein $Ar_3$ is a member selected from the group consisting of phenyl, lower alkylphenyl, trifluoromethylphenyl, halophenyl, dihalophenyl, lower alkyl-halophenyl and trifluoromethyl-halophenyl.

3. A chemical compound selected from the group consisting of a 4-aryl-1-(4,4-bis-p-fluorophenyl-butyl)-4-hydroxy-piperidine having the formula:

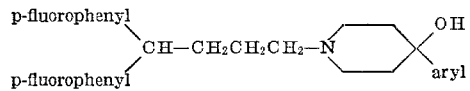

and the therapeutically active acid addition salts thereof, wherein aryl is a member selected from the group consisting of trifluoromethylphenyl, dihalophenyl and trifluoromethyl-halophenyl.

4. A compound of claim 3 wherein said halophenyl is chlorophenyl.

5. 1-[4,4-di-(4-fluoro-phenyl)-butyl] - 4 - hydroxy-4-(3,4-dichloro-phenyl)-piperidine.

6. 1-[4,4-bis(p-fluorophenyl)butyl] - 4-(α,α,α-trifluoro-m-tolyl)-4-piperidinol.

7. 4-(4-chloro-α,α,α-trifluoro-m-tolyl) - 1 - [4,4-bis(p-fluorophenyl)butyl]-4-piperidinol.

References Cited

UNITED STATES PATENTS 3,438,991  4/1969  Janssen  260—294.7J

HENRY R. JILES, Primary Examiner

S. D. WINTERS, Assistant Examiner

U.S. Cl. X.R.

260—293.4, 294, 294.3; 424—267